United States Patent [19]

Best et al.

[11] Patent Number: 5,073,833

[45] Date of Patent: Dec. 17, 1991

[54] DUAL SECTOR SERVO SYSTEM FOR DISK FILE WITH SEPARATE READ AND WRITE HEADS

[75] Inventors: John S. Best; Po-Kang Wang, both of San Jose, Calif.

[73] Assignee: International Business Machines Corporation, Armonk, N.Y.

[21] Appl. No.: 434,152

[22] Filed: Nov. 13, 1989

[51] Int. Cl.$^5$ .............................................. G11B 5/596
[52] U.S. Cl. ............................... 360/77.05; 360/77.01; 360/77.11
[58] Field of Search ............... 360/77.01, 77.03, 77.05, 360/77.07–77.08, 77.11, 75, 78.04, 78.14

[56] References Cited

U.S. PATENT DOCUMENTS

| | | | |
|---|---|---|---|
| 4,396,960 | 8/1983 | Matla et al. | 360/77.08 X |
| 4,729,048 | 3/1988 | Imakoshi et al. | 360/77.11 K |
| 4,833,551 | 5/1989 | Song | 360/77.05 |

FOREIGN PATENT DOCUMENTS 64-76473  3/1989  Japan ............................... 360/77.05

OTHER PUBLICATIONS

IBM/TDB vol. 20, No. 9, Feb. 1978 pp. 3673–3674, "Read/Write Servo Magnetic Head" by McEfee.
"Compensation for Elemet-to-Element Misregistration in a Dual Element Head", T. A. Schwartz, vol. 17, No. 1, Jun. 1974, TDB, pp. 217–218.
"Transducer Control for Sector Servo", TDB, vol. 21, No. 5, Oct. 1978, D. W. Brede, p. 2005.

*Primary Examiner*—John H. Wolff
*Attorney, Agent, or Firm*—Henry E. Otto, Jr.

[57] ABSTRACT

A method and servo system is provided to compensate for misalignment of separate read and write heads when reading and writing data on a magnetic disk.

Two sets of servo information are generated for each data track on the disk. These sets are radially displaced with respect to each other by a distance equal to the respective misalignments between the read and write heads at each respective data track. One set is generated by the write head. The other set is generated by the write head while the read head is positioned using said one set as a position reference. Thereafter, to write data on a selected track, the read head is first aligned with said one set of servo information and then data is written on said track with the write head. To read data on a selected track, the read head is aligned to said other set of servo information and then the data is read by said read head.

20 Claims, 2 Drawing Sheets

DUAL SECTOR SERVO SYSTEM FOR DISK FILE WITH SEPARATE READ AND WRITE HEADS

This invention relates to a servo method and means for compensating for misalignment of separate read and write heads with respect to a plurality of concentric data tracks in a magnetic disk file, and more particularly to such a method and means wherein separate read and write heads in a dual head structure are independently positioned on a selectable disk track for reading and writing by use of separate sets of servo information.

BACKGROUND OF THE INVENTION

When using separate heads for reading and writing, such as magneto-resistive (MR) heads for reading and inductive heads for writing, it is difficult to position alternately the read head to the track during reading, and the write head to the track during writing. This is not a serious problem when the misalignment between the read head and the write head is much smaller than the overall track misregistration and the track pitch of the system. However, in high track density applications or in systems with rotary actuators, where the read to write misalignment is no longer insignificant when compared to the track pitch, one is faced with two choices: (1) increase the degree of write-wide and read-narrow, i.e., (a) increase the write track width which results in lower track density, or (b) reduce read track width which results in lower signal-to-noise ratio—either of which results in performance degradation; or (2) devise a servo scheme to position the write head on the track for writing and the read head on the track for reading.

One arrangement heretofore proposed to independently position the read and the write heads to the track is described in the October 1978 issue of the *IBM Technical Disclosure Bulletin* at page 2005 and depicted in FIGS. 1A and 1B. When positioning the head for writing, the write head is used to read the sector servo information, as in FIG. 1A. When positioning the head for reading, the read head is used to read the sector servo information, as in FIG. 1B.

Another arrangement proposed to solve this misalignment problem is described in the June 1974 issue of the IBM Technical Disclosure Bulletin, at page 217. It requires reading a calibration pattern with both the read head and write head, and using that calibration pattern to measure the misalignment between the read and write heads. The misalignment is then stored and used by the head positioning servo system to offset the head position during read to compensate for the misregistration between the read and write elements. This approach requires the write head to read servo type information only during the calibration phase, which can be done in the factory, but requires a write head designed to read the calibration pattern and electronic circuitry that will permit reading with the write head.

In both approaches, the write head not only has to write data but also has to read the servo information. This requirement put significant limitations on applicability of the scheme, especially in high track density applications with MR-read/inductive-write heads. First, inductive heads have lower signal-to-noise ratio; and although this problem can be remedied to some degree with more turns in the coil, it adds process complexity and cost to head fabrication. Second, an inductive head optimized for writing will most likely have difficulty reading data at data frequency; and although servo information can be written at lower data rate, it adds to the real estate taken up for servo. Third, this arrangement requires one additional read channel for the write head. Finally, and also most important, thin film inductive heads with very narrow pole widths are likely to have domain problems for reading purposes, rendering them unusable for high track density applications.

There is a need for a method and means for compensating for misalignment of separate but linked read and write heads when reading and writing data on a magnetic disk whether such misalignment varies due to the arcuate direction of access with a rotary actuator or is of essentially constant magnitude due to variations in the relative positions at which the heads are mounted during manufacture of a radial linear actuator.

SUMMARY OF THE INVENTION

Toward this end and according to the invention, the following method and means is provided to compensate for misalignment of separate but linked read and write heads when reading and writing data on a magnetic disk.

Two sets of servo information are generated for each data track on the disk. These sets are radially displaced with respect to each other by a distance equal to the respective misalignments between the read and write heads at each respective track. One set is generated by the write head. The other set is generated by the write head while the read head is positioned using said one set as a position reference. Thereafter, to write data on a selected track, the read head is first aligned with said one set of servo information and then data is written on said track with the write head. To read data on a selected track, the read head is aligned to said other set of servo information and then the data is read by said read head.

BRIEF DESCRIPTION OF THE DRAWINGS

FIGS. 1–4 are schematic diagrams showing the relative positions of data and servo information for one of a plurality of distinct circumferential data tracks on a magnetic disk of a magnetic disk file. Only that portion of the servo information used to provide the location of the center of the one data track shown in each figure is shown in that figure.

More specifically.

FIG. 3 is a schematic diagram depicting how the read head is aligned with the first set of servo information while the write head is aligned with the second set of servo information during writing of data;

FIG. 4 is a schematic diagram depicting how the read head is aligned with the second set of servo information during reading of data.

DESCRIPTION OF PRIOR ART

Figure 1A:
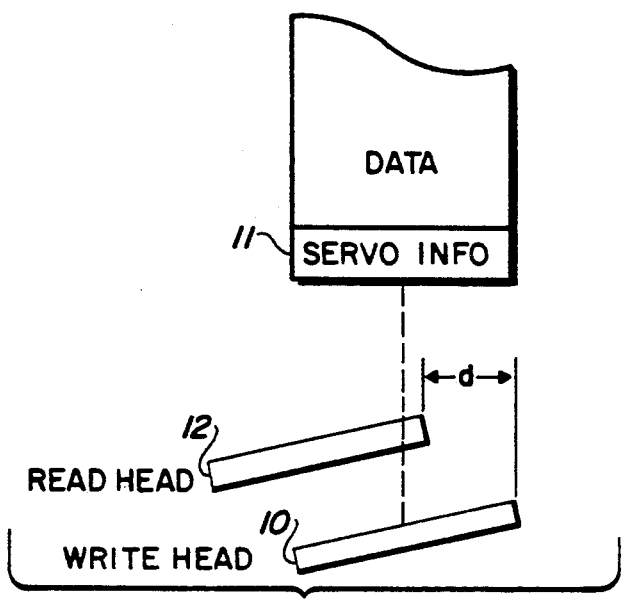
FIGS. 1A and 1B are schematic diagrams depicting how, according to one prior art approach, a write head and a read head are alternately aligned with a single set of servo information during writing and reading of data, respectively.
Figure 1B:
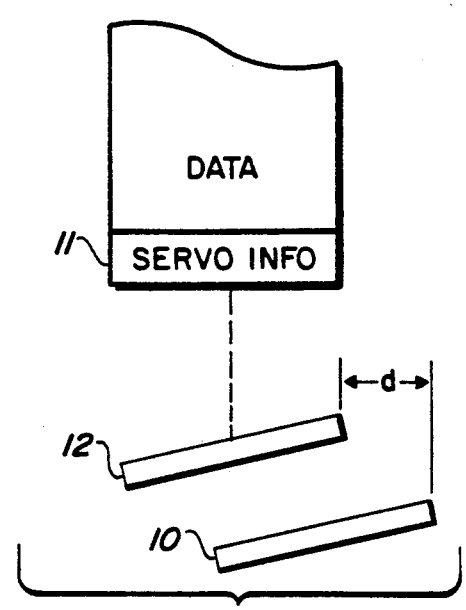

As illustrated in FIG. 1A during writing of data on a selected data track of a magnetic disk (not shown), write head 10 is aligned with and reads the servo information 11 on the track; and read head 12 is misaligned a distance d from the write head and servo information. As illustrated in FIG. 1B, during reading of data, read head 12 is aligned with and reads the servo information 11, while the write head 10 is now misaligned the distance d from the read head and servo information.

DESCRIPTION OF PREFERRED EMBODIMENT

Figure 2A:
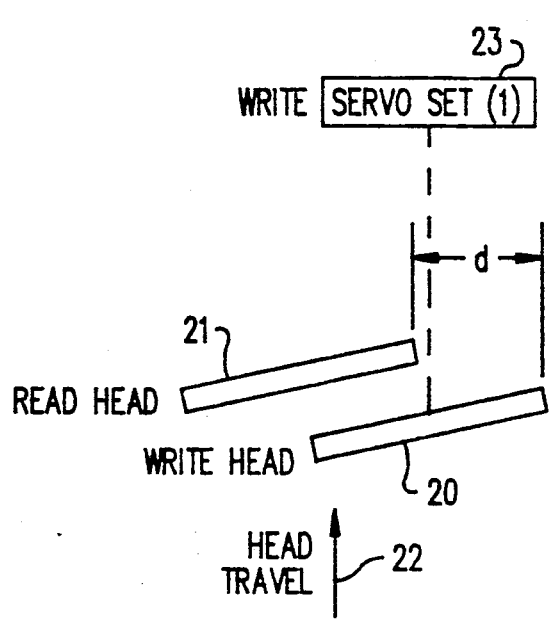
FIGS. 2A and 2B are schematic diagrams depicting how two sets of servo information are successively generated according to the invention.

As illustrated in FIG. 2A, a write head 20 and a read head 21 travel in the direction of arrow 22 relative to a plurality of concentric data tracks on a magnetic disk. While write head 20 and read head 21 are traveling in the direction of arrow 22, the write head is used to write and generate a first set 23 of sector servo information for each data track. Read head 21 will be misaligned the distance d from the write head and set 23 at this time.

Figure 2B:
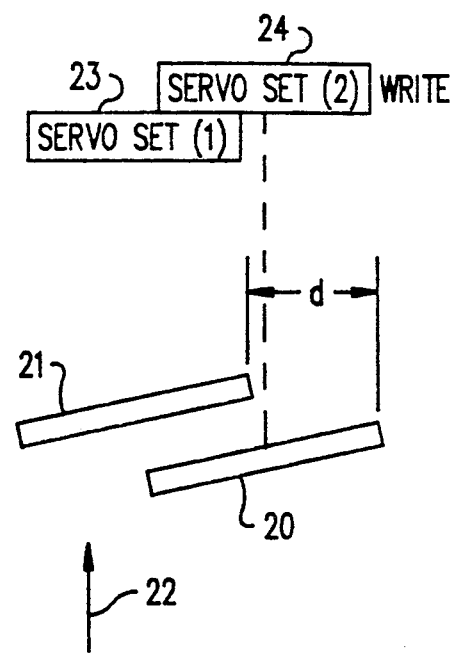

A second set 24 of sector servo information is now generated, as illustrated in FIG. 2B, for each data track by aligning read head 21 using the servo information set 23 and concurrently writing the second servo information set 24 with write head 20.

The steps just described generate, for all data tracks, two sets of servo information unique to each data track. Note that if the heads are mounted on a rotary actuator, the misalignment distance d will vary from track to track because of the non-radial (i.e., arcuate) path traversed by the actuator and hence the heads during track access.

Figure 3:
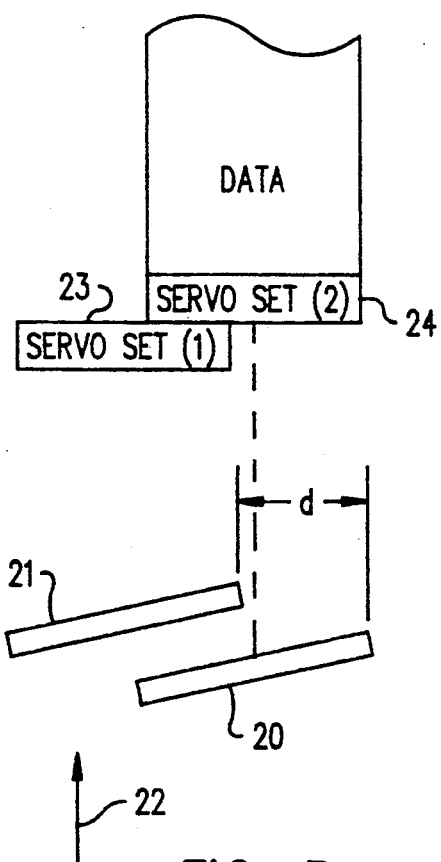

As illustrated in FIG. 3, data is written at a selected data track by aligning read head 21 to the first set 23 of servo information and then writing data on that track with write head 20. Since the data thus written is aligned with the second set 24, misalignment d of the heads will be automatically compensated for when the data is subsequently read in the following manner.

Figure 4:
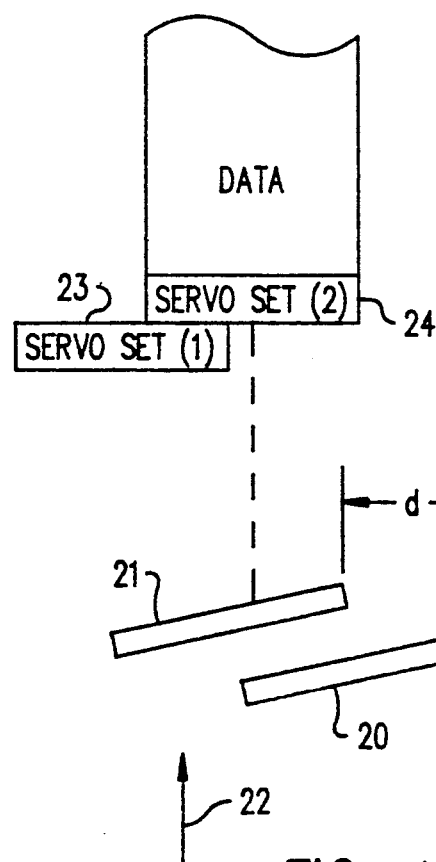

As illustrated in FIG. 4, data is read at a selected track by aligning read head 21 to the second set 24 of servo information and then reading the data with the read head. At this time, write head 20 will be misaligned distance d from read head 21 and second set 24 of servo information.

Thus, according to the invention, and as best shown in FIGS. 3 and 4, these two sets 23, 24 of servo information are provided at separate circumferential positions on the magnetic disk. One radially extending set (24) is in line with each data track and the other set (23) is offset in a generally radial direction from said one set by the distance d that will be of constant magnitude if the disk is accessed with a radial linear actuator or will vary from track to track if the disk is accessed with a rotary actuator.

Figure 5:
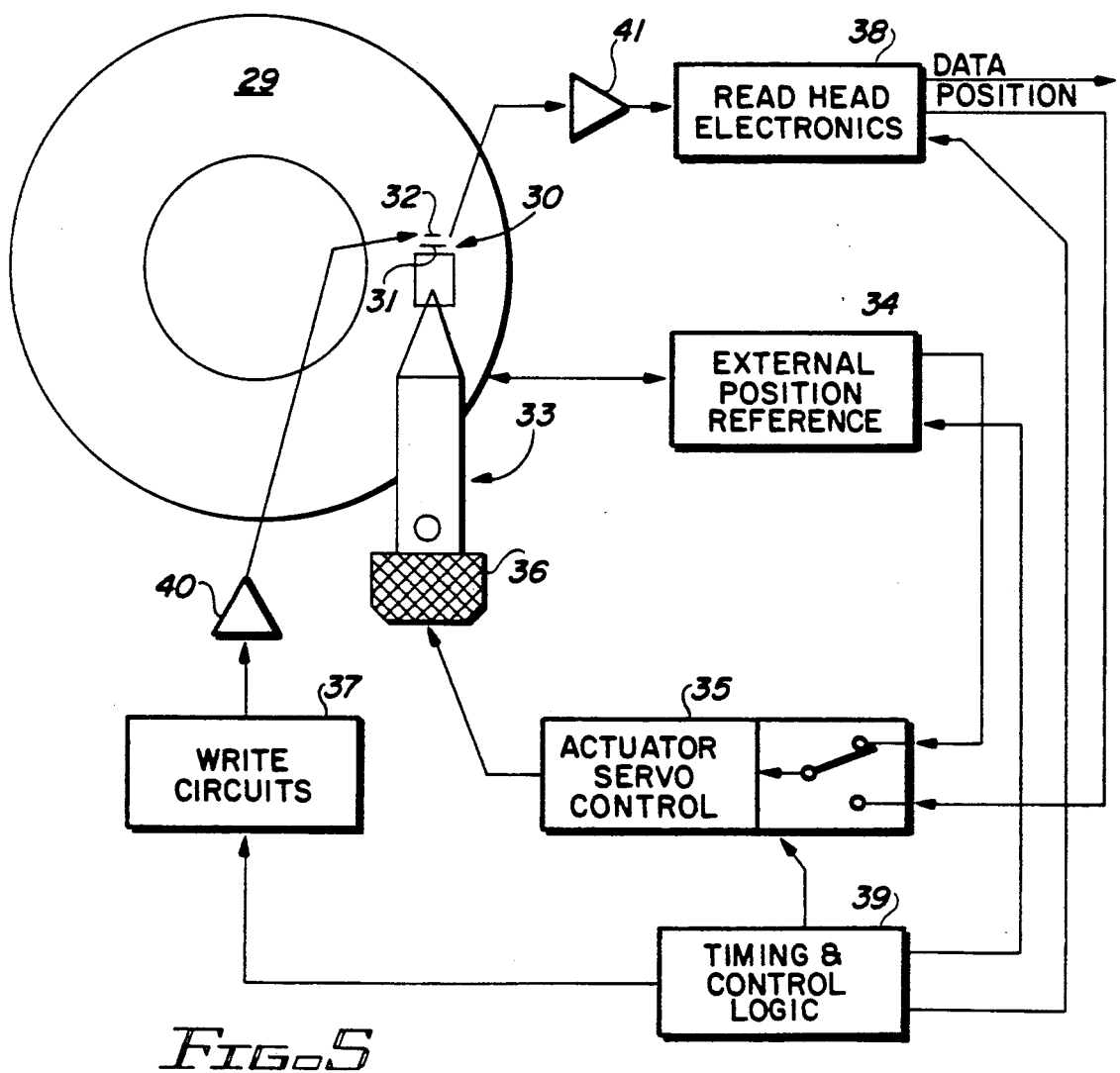
FIG. 5 is a schematic diagram of a sector servo control apparatus for implementing the invention.

FIG. 5 depicts a sector servo control apparatus for implementing the invention. This apparatus comprises a dual element head structure 30 comprising a read head 31 and a write head 32. As illustrated, head structure 30 is mounted on a rotary actuator 33 that moves the head structure 30 in an arcuate path to a selected track on magnetic or optical disk 29. An external position reference sensor 34 provides position information to servo control electronic circuitry 35 for actuator 33 which controls position of head structure 30 using a voice coil motor 36. Write circuits 37 provides signals to the write head 32 to write and to thereby generate the first set 23 of servo information on the disk. Next, read head electronic circuitry 38 processes the signals from read head 31 to provide position information to actuator servo control circuitry 35. This is used to position read head 31 over the first set 23 of servo information while writing and hence generating the second set 24 of servo information. The foregoing operation is controlled by timing and control electronic circuitry 39. Amplifiers 40, 41 amplify the write signal and read signal, respectively.

As earlier noted, the distance d will vary track to track if the heads are mounted on a rotary actuator. However, the invention is also of value when the heads are mounted on a radial linear actuator, especially in high track density applications. In this latter case, variations in distance d can occur from actuator to actuator due to the relative positioning of the heads during the manufacturing process; however, the misalignment distance d will be substantially constant for any given radial linear actuator.

The invention has been successfully implemented using a magneto-resistive read head and an inductive write head mounted on a rotary actuator. The invention can also be implemented with any sector servo arrangement, provided two sets of servo information are generated—one for writing and one for reading.

Although the servo arrangement herein disclosed requires additional storage capacity to provide the two sets of servo information, it desirably permits achievement of higher track densities by eliminating design concerns over misalignment of read and write heads.

While the invention has been shown and described with respect to a preferred embodiment thereof, it will be understood by those skilled in the art that changes in form and detail may be made without departing from the scope and teaching of the invention. Accordingly, the method and means herein disclosed are to be considered merely as illustrative, and the invention is to be limited only as specified in the claims.

We claim:

1. A method for compensating for misalignment of separate but linked read and write heads when reading and writing data on data tracks on a magnetic disk, including the steps of:

generating for all data tracks on the disk two sets of servo information at circumferentially offset positions, the two sets being radially displaced with respect to each other at each respective data track by a distance equal to the respective misalignments between the read and write heads at that respective track; and using one of said sets during writing of data on a selected data track and the other of said sets during reading of data on said selected data track to align the write head over said selected data track during writing and align the read head over said selected data track during reading of data on said selected data track, thereby compensating for misalignment of said heads with said selected data track.

2. The method of claim 1, including during the generating step, writing said one set of servo information on each respective data track with the write head; and writing said other set with the write head offset from said respective data track while the read head is positioned using said one set as a data track position reference.

3. A method for compensating for misalignment of separate but linked read and write heads when reading and writing data on data tracks on a magnetic disk, including the steps of:

generating with the write head a first set of servo information for, and spanning across, all data tracks on the disk;

positioning the read head relative to each of the data tracks using the first set of servo information as a track position reference and concurrently, using the write head, writing a second set of servo information for each of the data tracks, said second set being circumferentially offset with respect to said first set, said sets of servo information being displaced radially at each respective data track by a distance representing the amount of misalignment between said read and write heads at that respective track; and to write data on a selected data track, positioning the read head to align with the first set of servo information and concurrently writing data on said selected data track using the write head, whereby the data as written at said selected track will be aligned with the second set of servo information for said selected track so as to compensate for misalignment of said heads at said selected track during subsequent reading of data at said selected track.

4. The method of claim 3, wherein said read head is a magneto-resistive head and said write head is an inductive head.

5. The method of claim 3, including the step of mounting the heads adjacent each other on a rotary actuator, as a result of which the misalignment compensated for varies from track to track.

6. The method of claim 3, including the step of mounting the heads adjacent each other on a radial linear actuator, as a result of which the misalignment compensated for is of an essentially constant magnitude corresponding to the relative positions in which the heads are mounted during manufacture.

7. The method of claim 3, wherein the read and write heads are mounted in a dual head structure.

8. The method of claim 3, wherein the read and write heads are disposed longitudinally of the actuator.

9. The method of claim 3, wherein the read and write heads are disposed transversely of the actuator.

10. A method of compensating for misalignment of separate but linked read and write heads when reading and writing data on data tracks on a magnetic disk, including the steps of:

generating with the write head a first set of servo information for all data tracks on the disk;

positioning the read head relative to each data track using the first set of servo information as a data track position reference and concurrently, using the write head, writing a second set of servo information for each track, said sets of servo information at each respective data track being displaced radially by a distance representing the amount of misalignment between said read and write heads at that respective track; and to read data on a selected data track, positioning the read head to align with the second set of servo information and concurrently reading the data on said selected track using the read head, thereby compensating for misalignment of said heads at said selected track while reading the data at said selected track.

11. The method of claim 10, wherein said read head is a magneto-resistive head and said write head is an inductive head.

12. The method of claim 10, including the step of mounting the heads adjacent each other on a rotary actuator, as a result of which the misalignment compensated for varies from track to track.

13. The method of claim 10, including the step of mounting the heads adjacent each other on a radial linear actuator, as a result of which the misalignment compensated for is of an essentially constant magnitude corresponding to the relative positions in which the heads are mounted during manufacture.

14. The method of claim 10, wherein the read and write heads are mounted in a dual head structure.

15. The method of claim 10, wherein the read and write heads are disposed longitudinally of the actuator.

16. The method of claim 10, wherein the read and write heads are disposed transversely of the actuator.

17. Apparatus for compensating for misalignment of separate but linked read and write heads when reading and writing data on a magnetic or optical disk, said apparatus comprising:

means for conditioning the write head to generate in one radially extending servo region spanning a plurality of data tracks a first set of servo information for each data track on the disk;

means for positioning the read head to each data track to align with respect to the first set of servo information and concurrently conditioning the write head to write in a different radially extending servo region spanning a plurality of data tracks and circumferentially offset from said one servo region a second set of servo information for each data track, the radial displacement between said sets of servo information at each respective data track corresponding to the amount of misalignment between said read and write heads at that respective data track; and means for positioning the read head to align with respect to the first set of servo information and concurrently conditioning said write head to write data on a selected data track, whereby the data as written at said selected track will be aligned with the second set of servo information for said selected track so as to compensate for misalignment of said heads at said selected track when data is subsequently read at said selected track.

18. The apparatus of claim 17, wherein said read head is a magneto-resistive head and said write head is an inductive head.

19. The apparatus of claim 17, including means for positioning the read head to align with the second set of servo information and concurrently conditioning the read head to read said selected data track, thereby compensating for misalignment of said heads at said selected track while reading the data at said selected track.

20. The apparatus of claim 17, wherein said read head is a magneto-resistive head and said write head is an inductive head.

* * * * *